Figure 1:
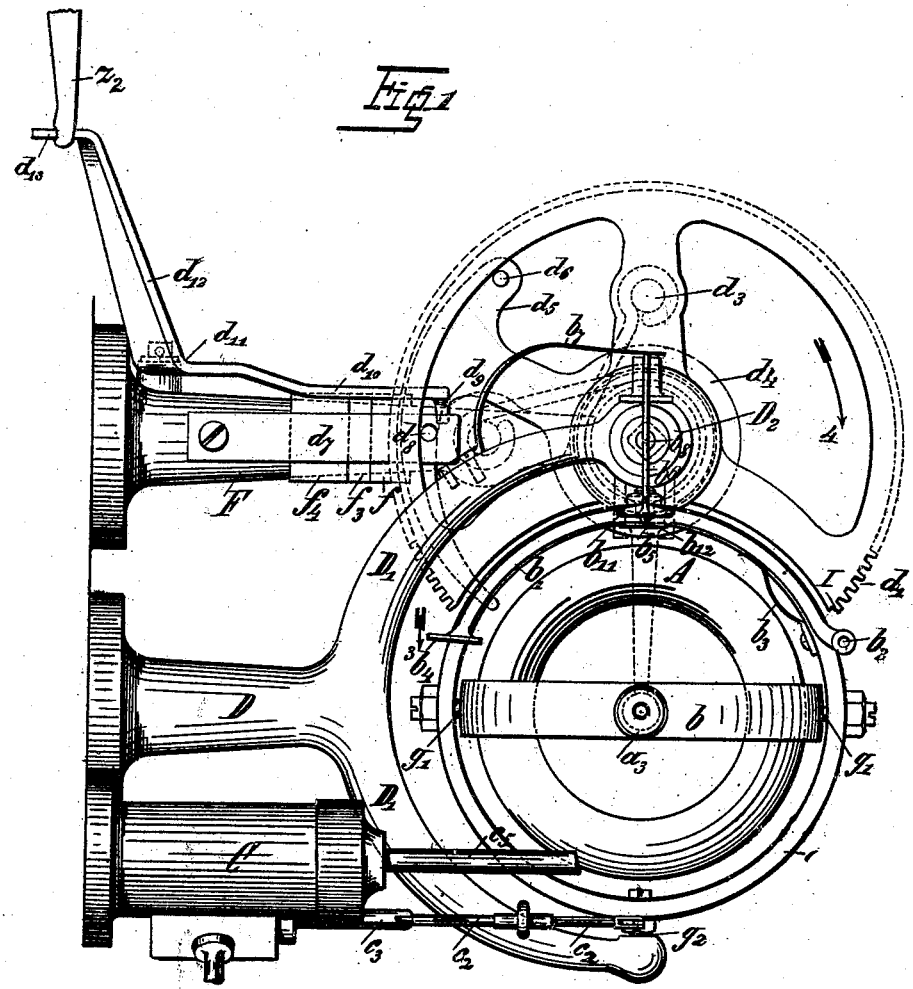

(No Model.) 7 Sheets—Sheet 1.

L. OBRY.
STEERING MECHANISM FOR TORPEDOES.

No. 562,235. Patented June 16, 1896.

Witnesses

Inventor
Ludwig Obry
by Curtis & Henning
Attorney (No Model.) 7 Sheets—Sheet 3.

L. OBRY.
STEERING MECHANISM FOR TORPEDOES.

No. 562,235. Patented June 16, 1896.

Witnesses

Inventor
Ludwig Obry
By Gustave W. Hopkins
Attorney (No Model.) 7 Sheets—Sheet 5.
L. OBRY.
STEERING MECHANISM FOR TORPEDOES.

No. 562,235. Patented June 16, 1896.

Witnesses

Inventor
Ludwig Obry
Attorney (No Model.) 7 Sheets—Sheet 6.
L. OBRY.
STEERING MECHANISM FOR TORPEDOES.
No. 562,235. Patented June 16, 1896.
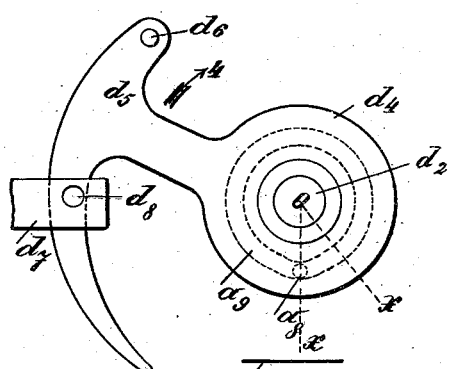
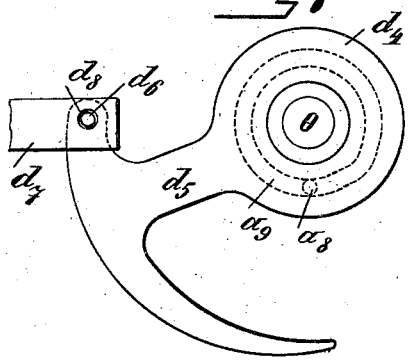 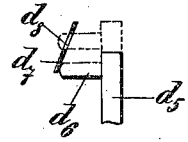
Witnesses
Inventor
Ludwig Obry
by Gustav W. Hopkins
Attorney

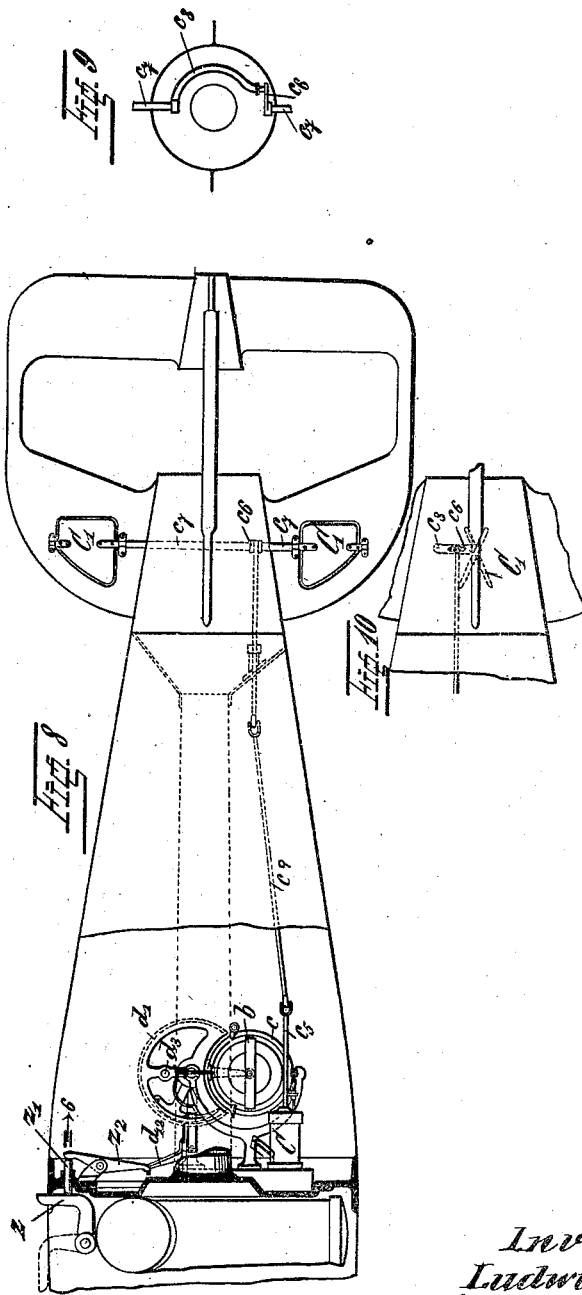

UNITED STATES PATENT OFFICE.

LUDWIG OBRY, OF TRIEST, AUSTRIA-HUNGARY.

STEERING MECHANISM FOR TORPEDOES.

SPECIFICATION forming part of Letters Patent No. 562,235, dated June 16, 1896.

Application filed December 12, 1894. Serial No. 531,613. (No model.)

*To all whom it may concern:*

Be it known that I, LUDWIG OBRY, a subject of the Emperor of Austria-Hungary, and a resident of Triest, in the Empire of Austria-Hungary, have invented a certain new and useful Improved Steering Mechanism for Torpedoes, of which the following is a full, clear, and exact description.

The present invention consists of a steering device for torpedoes, which is arranged after the manner of a gyroscope within the torpedo and is built up on the principle that a body revolving on a free axis tends to preserve its plane of rotation.

The gyroscope, which has its plane of rotation set parallel to the vertical symmetrical axis of the torpedo when the latter is introduced into the lancing-tube, is by suitable means caused to rotate at a high speed at the moment the torpedo is lanced or thrown.

In consequence of the above-mentioned well-known principle of the preservation of the plane of rotation, all planes in which the gyroscope rotates during the course of the torpedo will be parallel to the original position of the same, i. e., to the direction of fire or to the plane of the mark aimed at, and any diversion of the torpedo from its original course will be accompanied by a corresponding angular motion of the plane of rotation of the gyroscope to the symmetrical plane of the torpedo. According to the present invention, this relative angular motion is employed to operate a steering mechanism by converting, by means of suitable mechanism, the angular motion to a lineal one, which is employed to actuate the valve-motion of a Servo motor driven by compressed air, said motor in its turn operating the steering-gear of the torpedo.

The device consists, mainly, of three principal parts or mechanisms, viz: first, the mechanism for setting the rotating body of the gyroscope in motion; second, the means for automatically setting the fly-wheel of the gyroscope to the symmetrical plane of the torpedo, and, third, the mechanism for converting and transmitting the relative angular motion of the plane of rotation to the steering-gear.

In order to make the present invention more easily intelligible, reference is had to the accompanying set of drawings, in which similar letters of reference denote similar parts throughout the several views.

Figure 2:
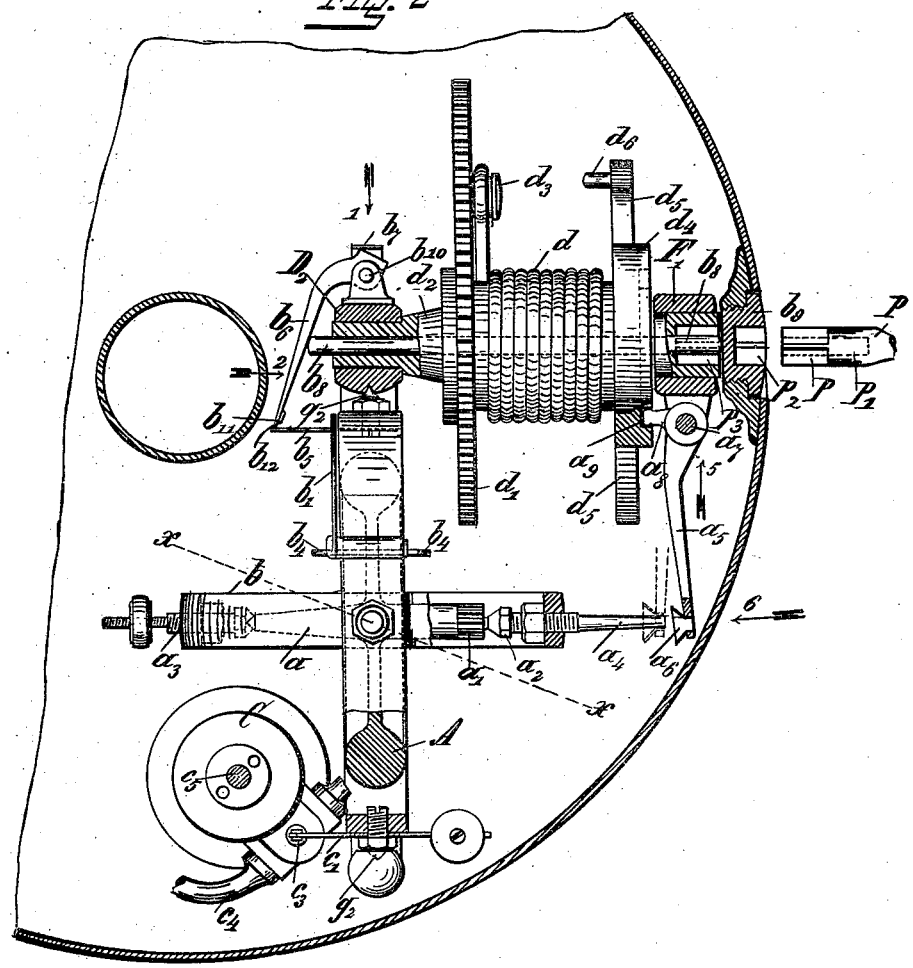
Figure 3:
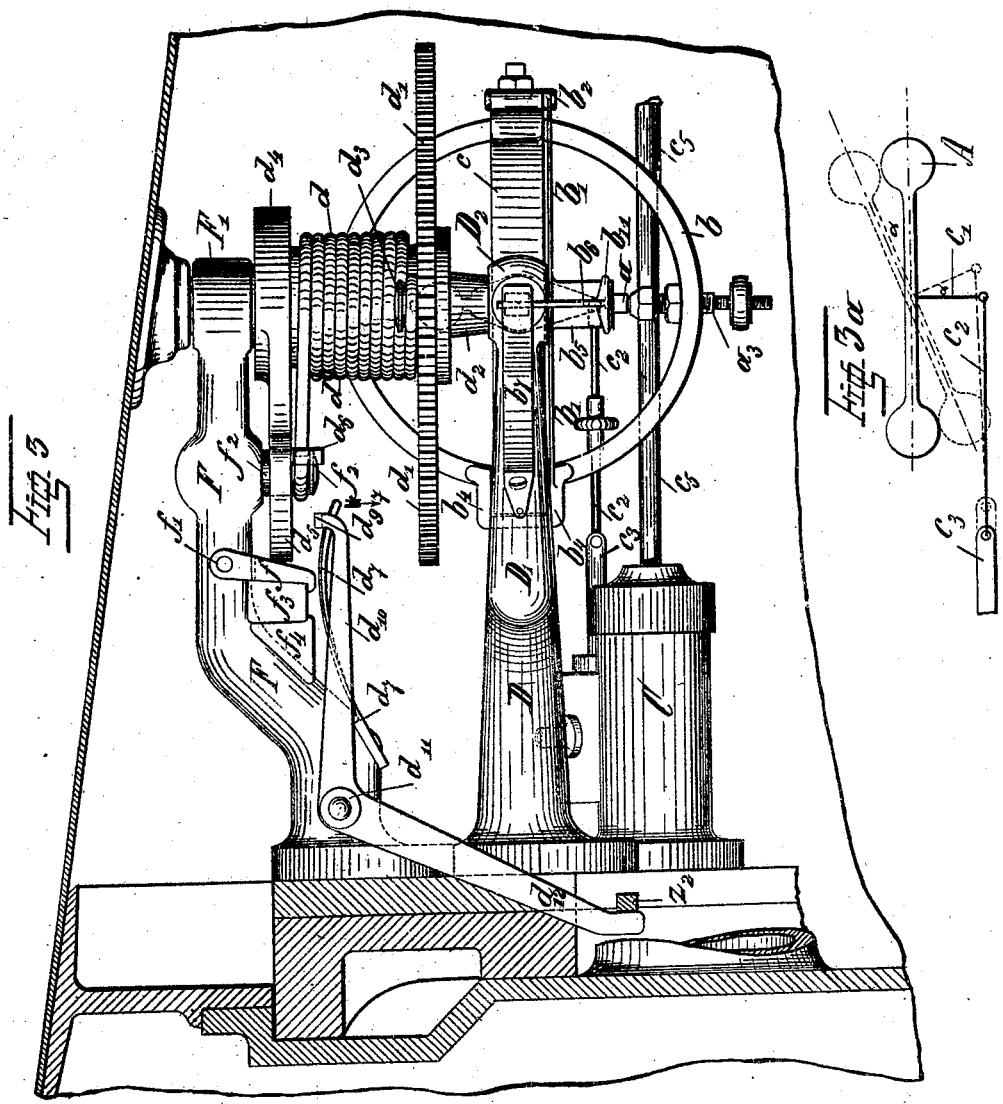
Figure 4:
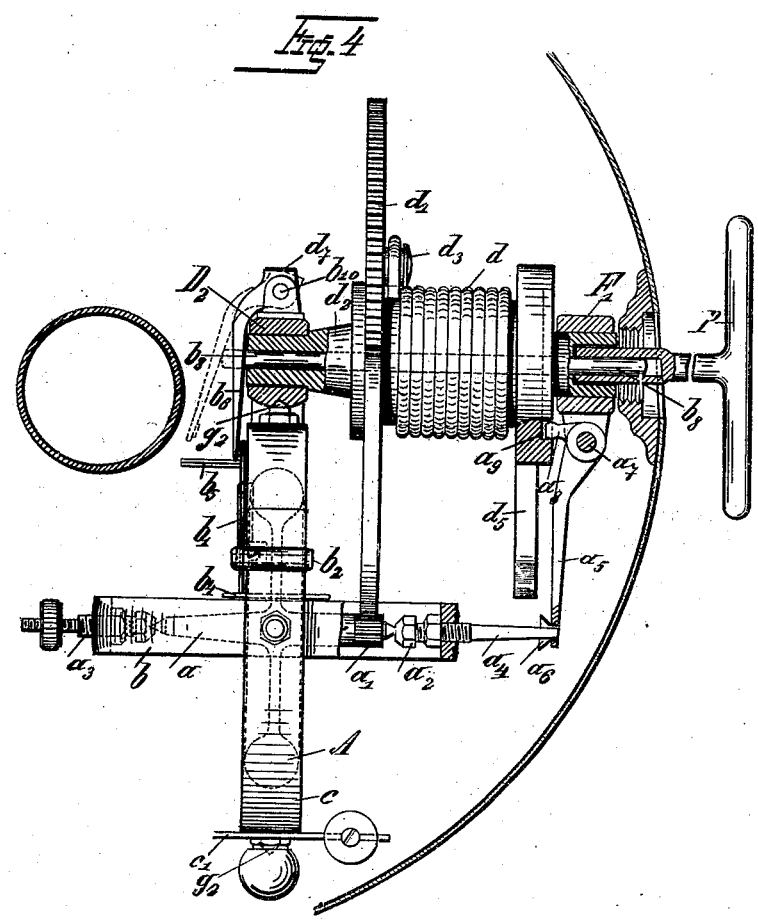

Figure 1 is a side elevation of the whole apparatus in its position of rest; Fig. 2, a front elevation, and Fig. 3 a plan, of Fig. 1. Fig. 3$^a$ is a detail view showing the action of the gyroscope as regards the lever system of the rudder. Fig. 4 shows a front and Fig. 5 a side elevation of the apparatus when in position immediately previously to the introduction of the torpedo into the lancing-tube. Figs. 6, 7 and 7$^a$ are details of the arresting and brake cam. Fig. 8 shows the rear end of a torpedo with the steering-gear, as also the arrangement of the apparatus in the torpedo and the connection of the vertical rudder or steering wings and the apparatus. Fig. 9 is a detail elevation of the crank for actuating the rudder. Fig. 10 shows the rudder-wings in side elevation.

As shown in Fig. 8, the whole apparatus is mounted on the bulkhead separating the engine-room from the ballast-room and is carried by two brackets or standards D and F. The gyroscope, which forms the main part of the apparatus, is mounted in the fork D' of the standard D, the ring $c$ being supported in the said fork on the center points $g^2 g^2$, and the inner ring $b$ on the points $g' g'$ of the ring $c$. The ring $b$ is provided, at two points diametrically opposite, with bearings $a^2 a^2$ adjustable by means of screws $a^3 a^4$, which serve to support the axis $a$ of the rotating body or fly-wheel A of the gyroscope.

In order to set the fly-wheel A of the gyroscope in rapid rotation, the spindle $a$ of the same, Fig. 2, is provided with a toothed pinion $a'$, which is arrested in a position parallel to a spindle $d^2$, mounted in bearings F' and D$^2$, Figs. 2 and 3, and carrying a toothed segment $d'$ at the moment at which it is to be started, so that the said segment, being in the same plane as the pinion, may engage in the same and start the fly-wheel.

The spindle $d^2$ carries a spiral spring $d$, wound on a suitable drum and having one end attached to a pin $d^3$ of the segment $d'$, while the other end is fixed to a pin $f^2$ of the standard F. The spindle $d^2$, Figs. 1, 2, 3, 6, and 7, has, furthermore, rigidly attached thereto a cam $d^5$, the periphery of which is eccentric, Fig. 1, said cam having a pin $d^6$ at one end. The spindle $d^2$ is provided with a square boring $p^3$ at the end nearest the torpedo-casing, Fig. 2, the latter being perforated at a point opposite the spindle end and fitted with a stopper $b^9$, screwed into a suitable seating. When the plug $b^9$ is in position in the side of the torpedo, it presses against the end of a rod $b^8$ lying within the hollow spindle $d^2$, retaining the same in the position shown in Fig. 2, so that the said rod $b^8$ will also hold the spring-pressed arm $b^6$, pivoted at $b^{10}$, in the position as shown at Fig. 2. The arm $b^6$ carries at its lower end a cross-arm $b^{11}$ and below the same a downwardly-projecting nose $b^{12}$, which latter presses on the bracket $b^5$ of a segment-arm $b'$, pivotally attached to the ring $c$ at $b^2$. The segment-arm $b'$ is retained in the position shown in Fig. 1 by a spring $b^3$, mounted on the ring $c$, and carries at its free end a three-sided horseshoe-shaped plate $b^4$, which loosely encircles the said ring $c$. The nave or boss of the segment $d^5$, keyed to the spindle $d^2$, is provided with a cam-groove $a^9$ at that surface of the same next the torpedo-casing, Figs. 2, 6, and 7, in which groove the arm $a^8$ of the lever $a^5$ engages, said lever being pivoted in a bearing of the standard F at $a^7$. The longer arm $a^5$ of this lever has a hopper-shaped mouthpiece $a^6$ at its free end. A spring $d^7$ is attached to the standard F, Figs. 1 and 3, and placed in such position as to allow the pin $d^6$ of the segment $d^5$ to enter a perforation $d^8$ of the said spring when the segment has attained a certain position, as hereinafter more particularly described. The spring $d^7$ is capable of being gripped by the hooked end $d^9$ of an angle-lever $d^{10}$, pivotally mounted at $d^{11}$, and having an upwardly-extending arm $d^{12}$, adapted to be grasped by one arm of a double-armed lever $z^2$, pivotally attached to the bulkhead, and having its upper end actuated by a sliding pin $z'$, mounted in suitable gland in the bulkhead and operated as hereinafter more particularly described.

The fly-wheel of the gyroscope and the setting and starting of the same take place in the following manner: The stopper $b^9$ is removed from the torpedo by means of the key P, having a squared end to fit the boring $p^2$ of the said stopper, and as the stopper is withdrawn the rod $b^8$ will follow its motion, releasing the lever $b^6$, which will move in the direction of the arrow 2 under the action of its spring pressing on it in the direction of the arrow 1, Fig. 2, bringing the cross-piece $b^{11}$ against the segment-arm $b'$. (See position Figs. 4 and 5.) Thus if the ring $c$ should have been in a position other than the normal one, it will be returned to and retained in the latter by the pressure exerted on it by the cross-arm $b^{11}$, as shown in Figs. 1, 2, and 3. Simultaneously with the motion of the arm $b^6$ in the direction of the arrow 2, the segment-arm $b'$ will be pressed downward by the action of the nose $b^{12}$ on the bracket $b^5$ in the direction of the arrow 3, Fig. 1, so that the shoe $b^4$ of the said arm will press on the ring $b$ and retain the same in the position shown in Figs. 4 and 5. If, for instance, the ring $b$ should have been in the position shown in dotted lines at $x x$, Fig. 2, the shoe $b^4$ will immediately return it to its normal position. The fly-wheel or rotating body of the gyroscope is now in a position parallel to the plane of symmetry of the torpedo and it is now required to arrest the spindle $a$ of the same in this position, so that it may be properly started by the segment $d'$. In order to effect this, the key P, which was used to withdraw the plug $b^9$, is inserted into the squared recess at the end of the spindle $d^2$ and the toothed segment $d'$ turned in the direction of the arrow 4, Fig. 1. The angular movement of the segment $d'$, in order to bring its teeth into engagement with the pinion $a'$ of the spindle $a$, will of course be accompanied by the corresponding movement of the boss $d^4$ of the segment $d^5$, Fig. 6, which is keyed to the spindle $d^2$. This angular movement O $x x$ will cause the cam-groove $a^9$ to actuate the arm $a^8$ of the lever $a^5$ and pull the said arm $a^8$ nearer to the center O, Fig. 6. The movement of the arm $a^8$ in the direction of the arrow 5 causes the lever $a^5$ to move in the direction of the arrow 6 and take up the position shown in Fig. 4, so that the extension $a^4$ of the bearing $a^2$ will be retained by the hopper-shaped mouthpiece $a^6$. The moment the spindle $a$ is arrested in the manner just described, the segment $d'$ comes into engagement with the pinion $a'$ and remains geared with the same while the spring $d$ is being further stretched by the continued turning of the spindle.

Figure 5:
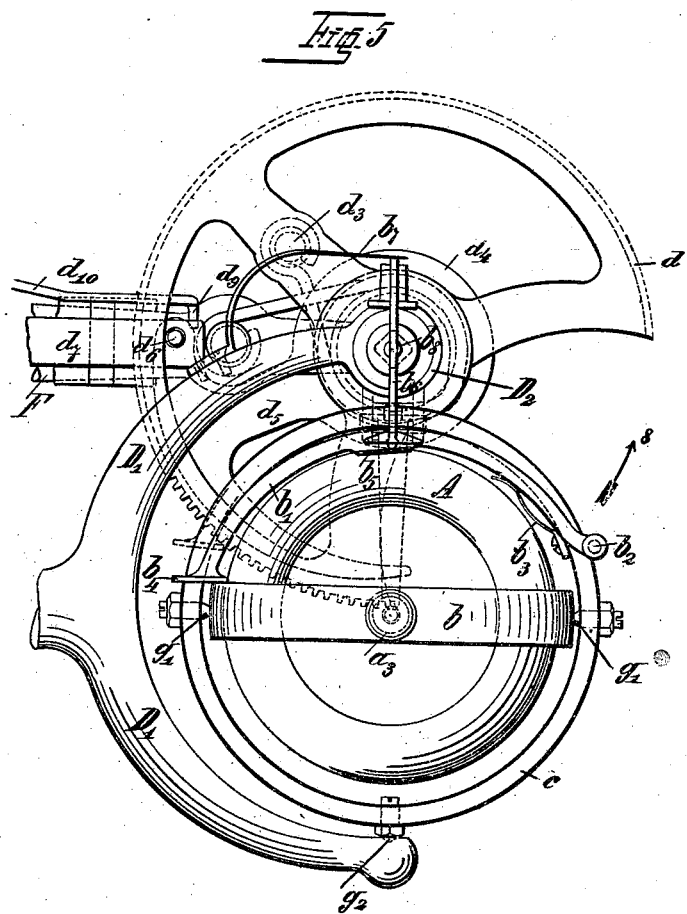

The spindle $d^2$ may be turned by means of the key P until the pin $d^6$ of the segment $d^5$ passes under the inclined spring $d^7$, Fig. 7$^a$, and gliding along and simultaneously raising the same will be arrested by it as soon as the perforation $d^8$ of the said spring comes into position over the said pin $d^6$, when the spring will regain its former position. When the mechanism is in this position, as shown at Figs. 4, 5, and 7, the key P is withdrawn and the plug $b^9$ replaced in the side of the torpedo. This will have the effect of pushing out the lever $b^6$, which allows the segment $b'$ to return to its former position under the action of the spring $b^3$, so that with the exception of the guide-arm $a^5$ the gyroscope is free to move in any direction, the parts $b^6$ $b^5$ $b'$ having returned to their former positions. The torpedo is placed in the lancing-tube with the parts in this position. The moment the torpedo is discharged the air-hole lever $z$, Fig. 8, will be thrown over from the position shown in dotted lines to that in full lines, driving the sliding pin $z'$ in the direction of the arrow 6$^a$, which communicates motion by the lever system $z^2$, $d^{10}$, and $d^{12}$ and hooked end $d^9$ of the latter to the spring $d^7$, pulling the same in the direction of the arrow 7, Fig. 3, and lifting it off the pin $d^6$ of the cam $d^5$, whereby the spring $d$ is released, the segment $d'$ flies back, under the powerful momentary impulse, imparting to the spindle $a$ of the rotary mass A a rapid rotary motion owing to the diameter of the segment being so much larger than that of the pinion. In order to arrest the segment $d'$ in its almost momentary movement, in the position shown in Fig. 1, and at the same time to deaden the concussion which would otherwise be imparted to the apparatus by the sudden stoppage of the rapidly-moving mass of the segment, the periphery of the cam $d^5$ is made eccentric, as previously mentioned, and thus gradually contacts with the cheek $f$ with increasing pressure, so that the motion of the spindle $d^2$ is gradually stopped. The brake block or cheek $f$ is furthermore pivotally mounted at $f'$, and behind the same is arranged a caoutchouc or rubber block $f^3$, mounted on a block $f^4$, Figs. 1 and 3. As soon as the cam $d^5$ has been arrested in its original position—viz., that shown in Figs. 1, 2, and 3—the cam-groove $a^9$ will also have been shifted and have brought the arm $a^5$ out of contact with the extension $a^4$ of the spindle $a$. Thus at the moment the torpedo leaves the lancing-tube the gyroscope is entirely freed, the rotary mass is in rapid rotation, with its plane in the plane of symmetry of the torpedo, as it was in the lancing-tube. Assuming now that the course of the torpedo is diverted by any cause whatever, the plane of rotation of the body A remaining unaltered, the axis of the torpedo will move or perform a certain angular motion, with regard to the plane of the body A, and as far as the result is concerned it is immaterial whether the case be considered in its actual state or whether the body A is considered to have altered its plane of rotation and the axis of the torpedo to have remained the same. In view of these facts let it be supposed that the body A had moved from its original position, Fig. 3ª, into that shown in dotted lines. The relative angular motion will be followed by the frame $c$ and with it the crank $c'$, which takes the position shown in dotted lines, imparting motion to the slide-rod $c^2$. To the rod $c^2$ is attached the valve $c^3$ of a Servo motor, which operates the piston-rod $c^5$ in the well-known manner of these motors worked by compressed air and employed for under-water-steering purposes, so that the said piston-rod $c^5$ will move the crank $c^6$, Fig. 8, by means of the connecting-rod $c^9$ and with it the shaft $c^7$ of the rudders C' C' in the opposite direction to that in which the torpedo was diverted from its original course.

In conclusion some of the advantages offered by the present construction, in addition to the accurate steering, may be mentioned.

As is well known, at the present time it is very difficult to arrange broadside lancing-tubes under the armor-deck, or, in other words, under the water-line, owing to the diversion of the torpedo by the pressure of the water, which occurs in spite of the projections in the lancing-tube. The diversion is in some cases sufficient, in spite of the steering devices employed, to cause the torpedo to come round in a wide curve until it has again reached the ship which launched it. Torpedoes, having the steering mechanism hereinbefore described, cannot be diverted in this manner, as the same will always return to the plane of direction of lancing, however great the diversion may have been. The device further enables the torpedo being lanced at a certain angle to the direction of the lancing-tube. In order to effect this, it will be sufficient to displace the slide or to shorten or lengthen the slide-valve rod in order to keep the rotation plane of the gyroscope at a certain angle to the rudder. For instance, if the slide-rod is shortened to correspond with the position it would take if the plane of rotation of the gyroscope had been displaced thirty degrees, the direction of the torpedo, on entering the water, will be altered until the rudder has regained its normal position, which will not take place, in consequence of the displacement of the slide-rod, until the gyroscope has turned thirty degrees, and thus brought the slide back to its original position. Since, however, a turning of the gyroscope means altering the direction of the torpedo thirty degrees, the torpedo will be lanced or launched in a direction at an angle of thirty degrees to the direction of the lancing-tube. This possibility of launching torpedoes at any desired angle goes to prove that by means of the present device broadside discharges may be accomplished from the bow or stern end of the ship. In this case the slide-rod must be adjusted to correspond to a turning of the gyroscope equal to ninety degrees.

I claim as my invention—

1. A device for steering torpedoes consisting mainly of a gyroscope mounted within the torpedo having a frame or ring $c$ mounted in fixed bearings and carrying a crank $c'$, a rod $c^2$ connecting the said crank $c'$ to the sliding valve-rod $c^3$ of a Servo motor driven by compressed air, a piston-rod $c^5$ and connection from the same to the crank $c^6$ of the rudder or steering wing shaft $c^7$, so that a relative movement of the plane of rotation of the gyroscope to the vertical plane of symmetry of the torpedo will cause a displacement of the slide $c^3$ and by means of the piston-rod $c^5$ of the Servo motor, a displacement of the rudder-wings C' C' in the opposite sense in which the relative angular motion of the plane of rotation of the gyroscope took place.

2. The combination with a steering device for torpedoes, of means for setting in motion the rotary body A of the gyroscope consisting of a spring-actuated toothed segment $d'$ rigidly mounted on a spindle $d^2$, means for bringing the said segment into engagement with a driving-pinion $a'$ of the spindle $a$ of the rotary mass or body, and for disengaging the same when the spring of the said segment has run down, a cam $d^5$ fast on the said spindle $d^2$ having a pin $d^6$ and a spring $d^7$ suitably mounted and having a perforation $d^8$ for the reception of the pin $d^6$ to arrest the said spring $d$ in its stretched position substantially as described.

3. In combination with the driving mechanism of the rotary body or mass A of a gyroscope, a device for releasing the spring consisting mainly of an angle-lever $d^{10}$ $d^{12}$ having hooked end $d^9$ embracing the end of the spring $d^7$, a pivoted lever $z^2$, pin $z'$ and tumbler-lever $z$ to actuate said lever $d^{10}$, $d^{12}$ at the moment of discharge of the torpedo, substantially as described and shown.

4. In combination with a gyroscope mounted in a torpedo, a sliding rod $b^3$ mounted within the hollow spindle $d^2$, a spring-pressed lever $b^6$ pivotally mounted across the end of the said sliding rod, a cross-arm $b^{11}$ to said lever and downwardly-projecting nose $b^{12}$, a segment-arm $b'$ pivoted to the ring $c$ and having horseshoe-shaped horizontal plate $b^4$ to contact with the ring $b$ when the said segment-arm is depressed, a bracket $b^5$ to said segment-arm on which the nose $b^{12}$ rests and a plug $b^9$ to operate the sliding rod substantially as described.

In witness whereof I, LUDWIG OBRY, hereunto set my hand in presence of two witnesses.

LUDWIG OBRY.

Witnesses:
FRITZ ZUM BRUNNEN,
ETTARECK SCERDILLY.